US010635581B2

(12) United States Patent
Tang et al.

(10) Patent No.: US 10,635,581 B2
(45) Date of Patent: Apr. 28, 2020

(54) HYBRID DRIVE GARBAGE COLLECTION

(71) Applicant: Seagate Technology LLC, Cupertino, CA (US)

(72) Inventors: Alex Tang, Cupertino, CA (US); Leonid Baryudin, San Jose, CA (US); Timothy Canepa, Los Gatos, CA (US); Mark Ish, Castro Valley, CA (US); Jackson Ellis, Fort Collins, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/411,550

(22) Filed: Jan. 20, 2017

(65) Prior Publication Data

US 2018/0210675 A1 Jul. 26, 2018

(51) Int. Cl.
*G06F 12/02* (2006.01)

(52) U.S. Cl.
CPC .. *G06F 12/0246* (2013.01); *G06F 2212/7202* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 8,312,219 B2 | 11/2012 | Cher et al. | |
| 8,341,339 B1 * | 12/2012 | Boyle | G06F 12/0246 711/103 |
| 8,700,949 B2 | 4/2014 | Eleftheriou et al. | |
| 8,719,501 B2 | 5/2014 | Flynn | |
| 8,838,936 B1 | 9/2014 | Salessi et al. | |
| 8,966,205 B1 | 2/2015 | Lo et al. | |
| 9,218,281 B2 | 12/2015 | Cohen et al. | |
| 10,210,084 B1 | 2/2019 | Bruce | |
| 2007/0288692 A1 | 12/2007 | Bruce et al. | |
| 2010/0281230 A1 * | 11/2010 | Rabii | G06F 3/0605 711/165 |
| 2012/0246403 A1 * | 9/2012 | McHale | G06F 3/0604 711/114 |
| 2013/0073783 A1 * | 3/2013 | Cao | G06F 3/0611 711/103 |
| 2013/0159597 A1 * | 6/2013 | Cheong | G06F 12/0638 711/102 |
| 2013/0238832 A1 | 9/2013 | Dronamraju et al. | |
| 2014/0115235 A1 * | 4/2014 | Ito | G06F 12/0868 711/103 |
| 2014/0115238 A1 * | 4/2014 | Xi | G06F 12/12 711/103 |
| 2014/0122774 A1 | 5/2014 | Xian et al. | |
| 2015/0058525 A1 | 2/2015 | Venkata | |
| 2016/0299715 A1 * | 10/2016 | Hashimoto | G06F 3/0619 |
| 2018/0039441 A1 * | 2/2018 | Nimura | G06F 3/0635 |

* cited by examiner

*Primary Examiner* — Kevin Verbrugge
(74) *Attorney, Agent, or Firm* — Holzer Patel Drennan

(57) ABSTRACT

A garbage collection method comprises selecting one or blocks in a SSD of a hybrid drive for garbage collection; determining a state of data of the one or more selected blocks, wherein the state suggests a location and temperature of data; and executing a garbage collection efficiency and caching efficiency action on the data of the one or more selected blocks based on the determined state. The garbage collection process may utilize the state information provided by the cache layer of the hybrid drive to make decisions regarding data in the one or more selected blocks.

19 Claims, 9 Drawing Sheets

HYBRID DRIVE GARBAGE COLLECTION

CROSS REFERENCE TO RELATED APPLICATIONS

This application is related to U.S. patent application Ser. No. 15/411,679, titled, "Hybrid Drive Translation Layer" and filed 20 Jan. 2017, which is specifically incorporated by reference herein for all that it discloses and teaches.

BACKGROUND

Hybrid drives, such as solid state hybrid drives SSHDs may contain various storage media. Such various storage media may include solid state media and disc media. The solid state media may act as a cache for fast data storage and retrieval. The disc media may include rotating magnetic or optical storage media for high capacity storage. Generally, a caching algorithm may determine what data is stored to the solid state media of the hybrid drive and a garbage collection process proactively manages free space in the solid state media.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

A method comprises selecting one or more blocks in a SSD of a hybrid drive for garbage collection. The hybrid drive includes a HDD. The method further comprises determining a state of data in the one or more selected blocks, wherein the state suggests a location and temperature of data; and evicting the data by not rewriting the data to a new location in the SSD based on the determined state. In some implementations, the data is demoted based on the determined state.

These and various other features and advantages will be apparent from a reading of the following Detailed Description.

BRIEF DESCRIPTIONS OF THE DRAWINGS

Figure 2:
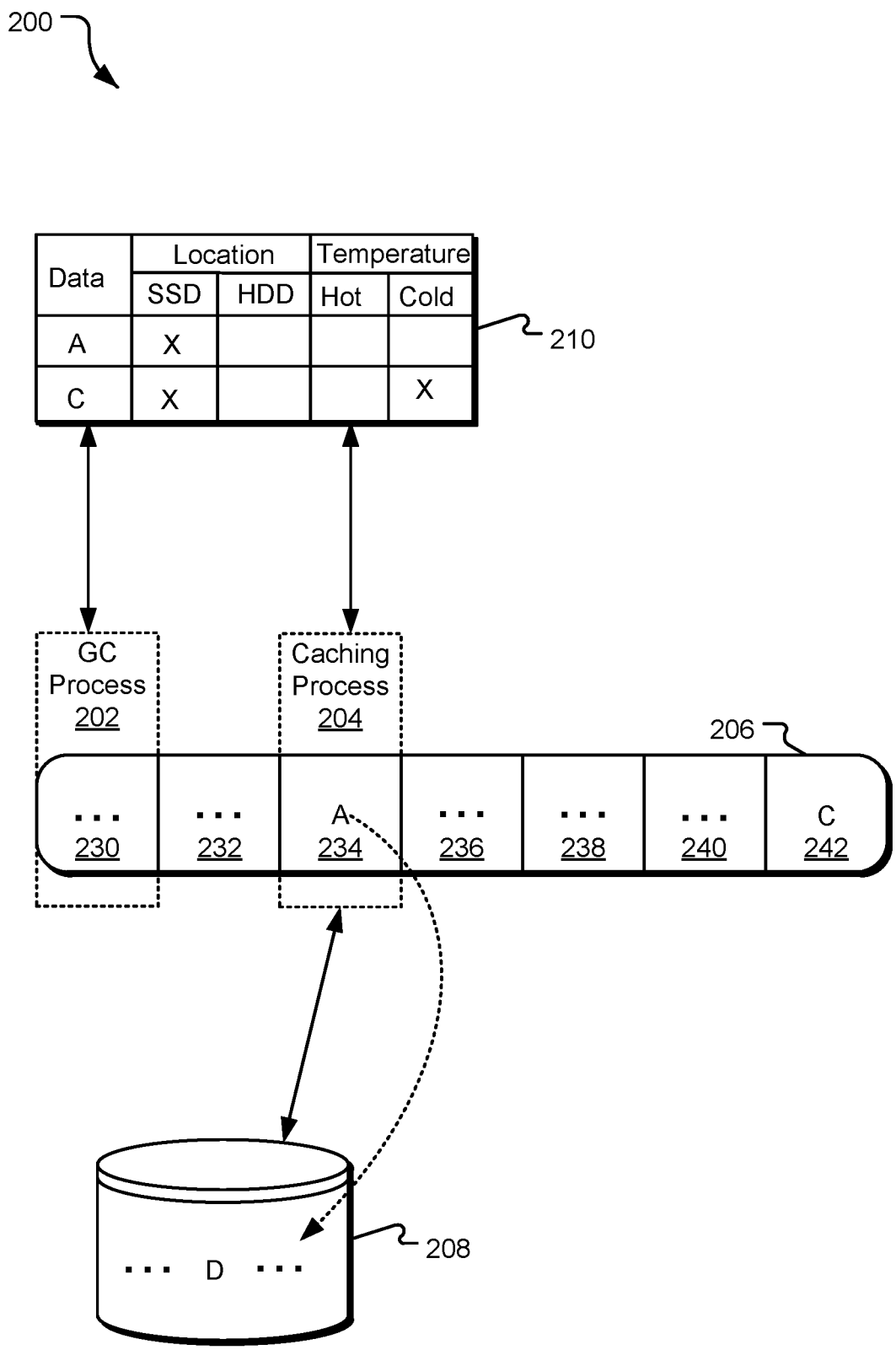
FIG. 2 illustrates example information and data flow in a hybrid drive.
Figure 3:
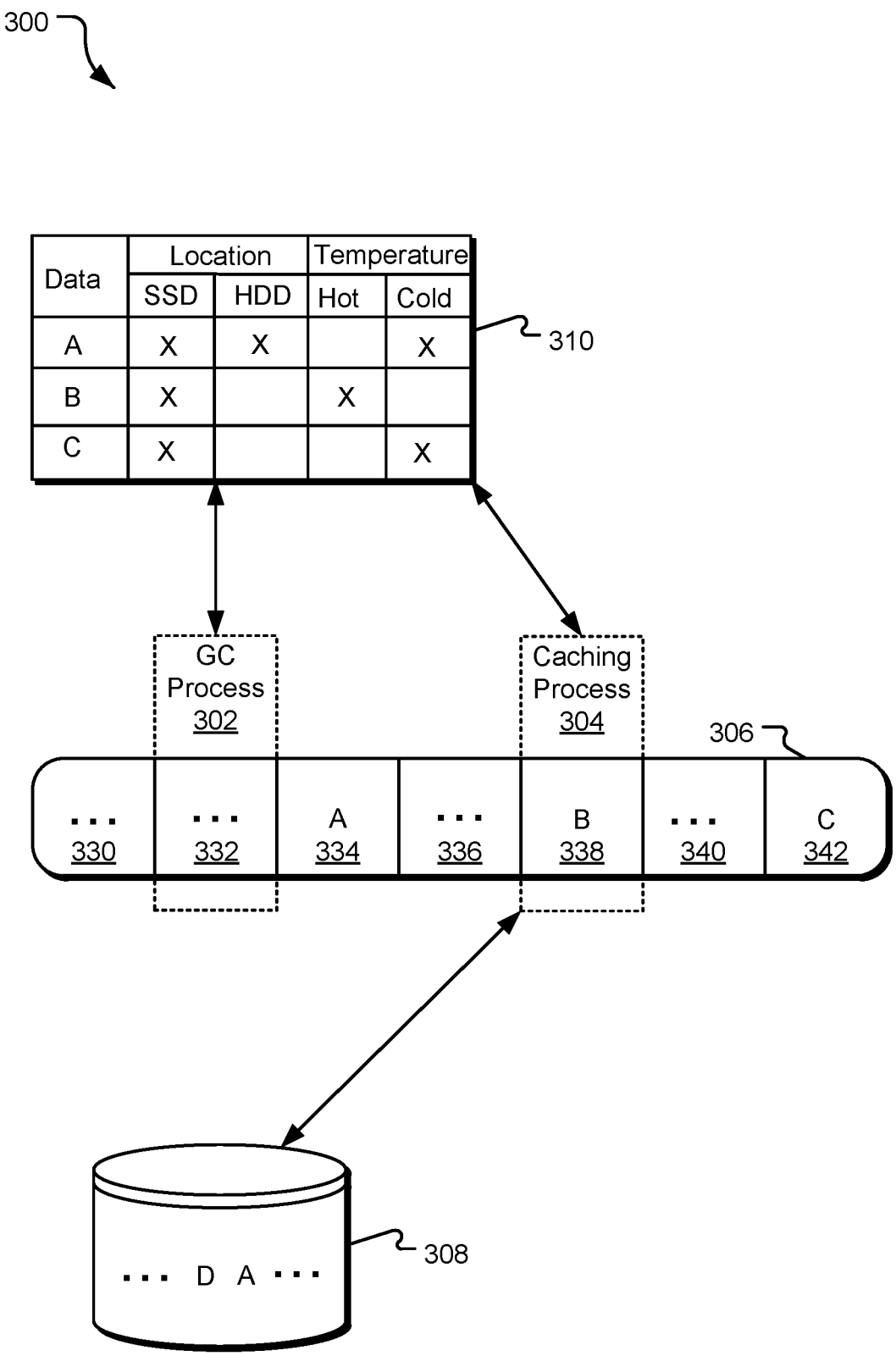

FIG. 3 further illustrates the example information and data flow in the hybrid drive illustrated in FIG. 2.

Figure 4:
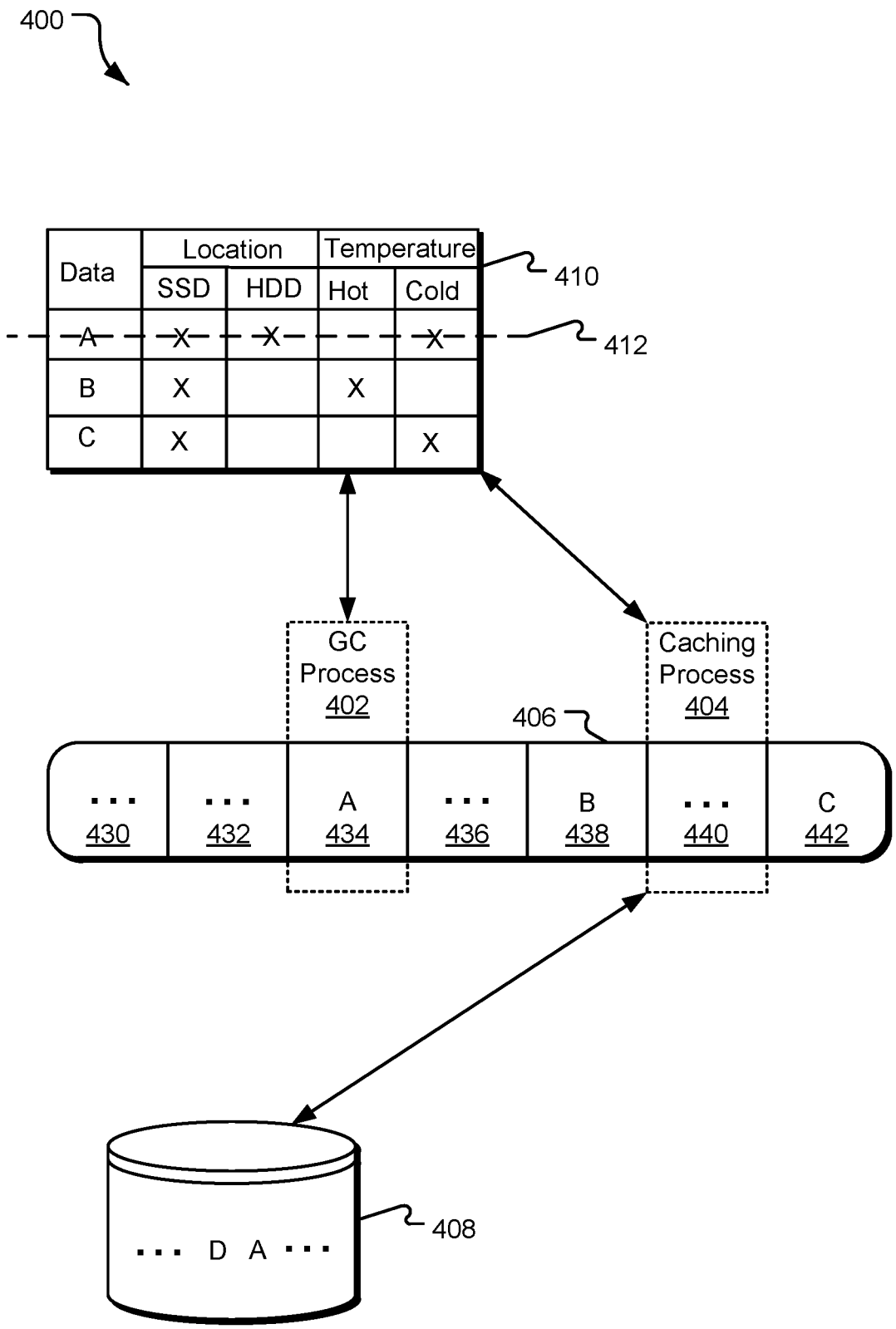

FIG. 4 further illustrates the example information and data flow in the hybrid drive illustrated in FIGS. 2 and 3.

Figure 5:
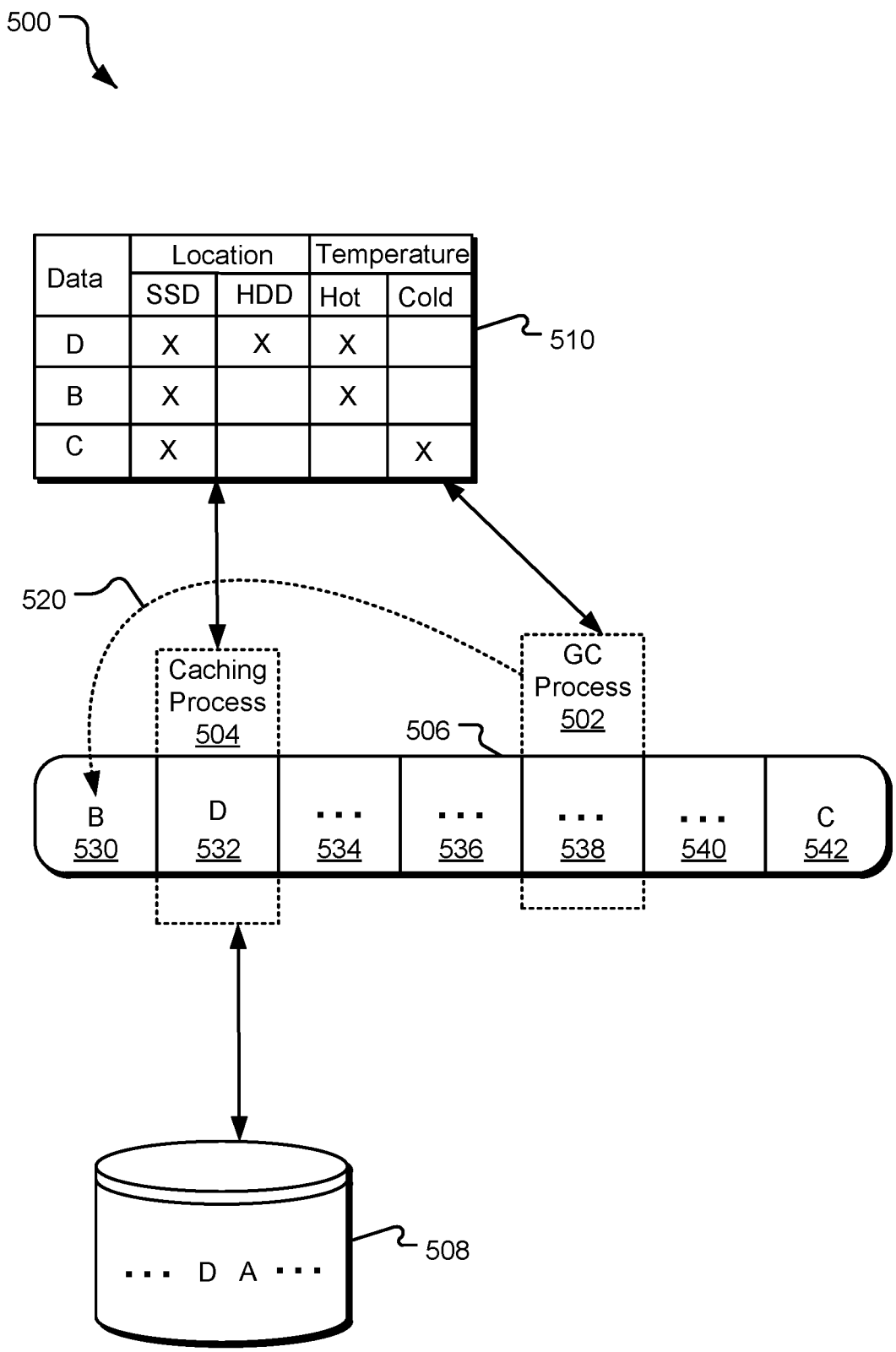

FIG. 5 further illustrates the example information and data flow in the hybrid drive illustrated in FIGS. 2-4.

Figure 6:
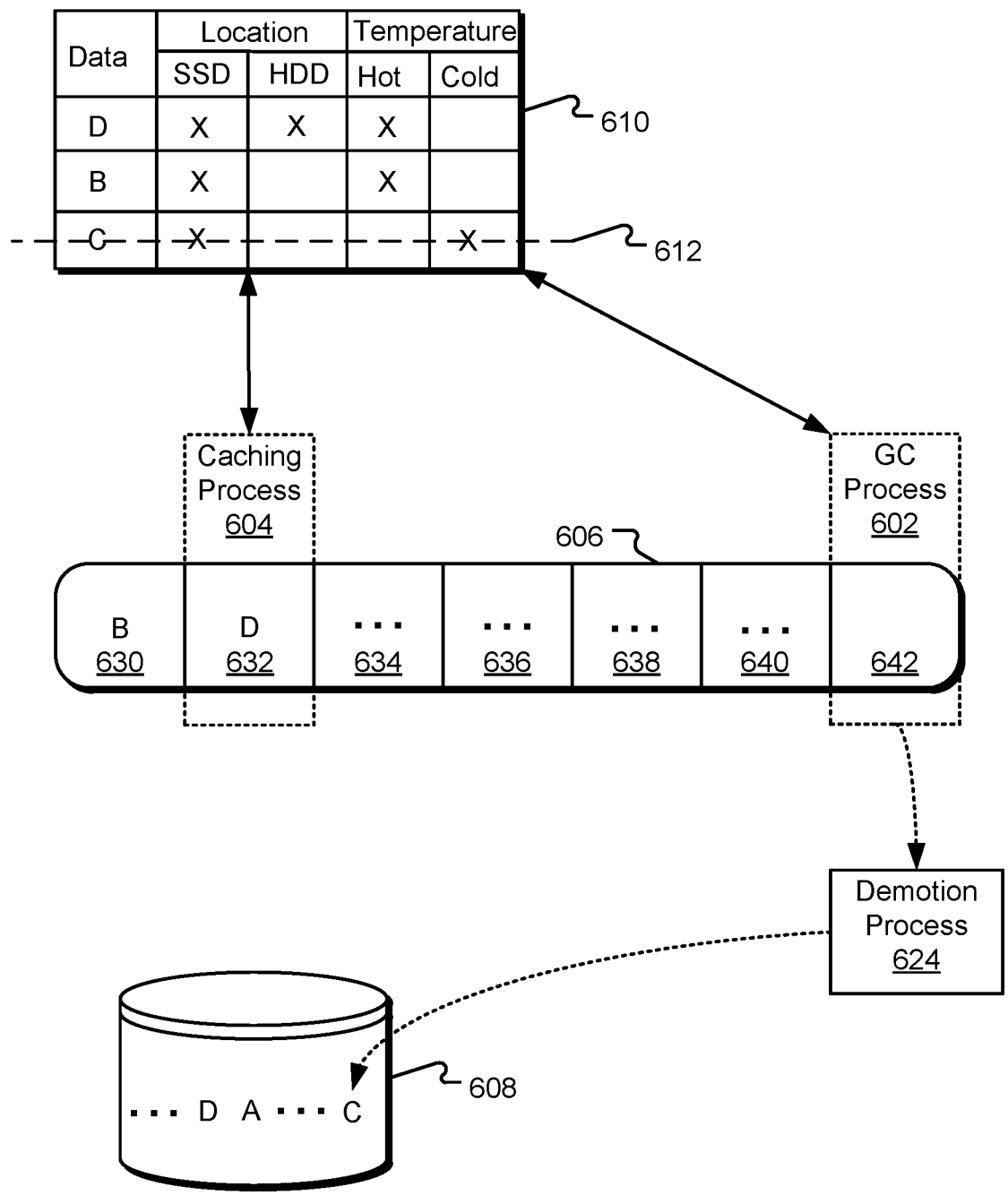

FIG. 6 further illustrates the example information and data flow in the hybrid drive illustrated in FIGS. 2-5.

Figure 7:
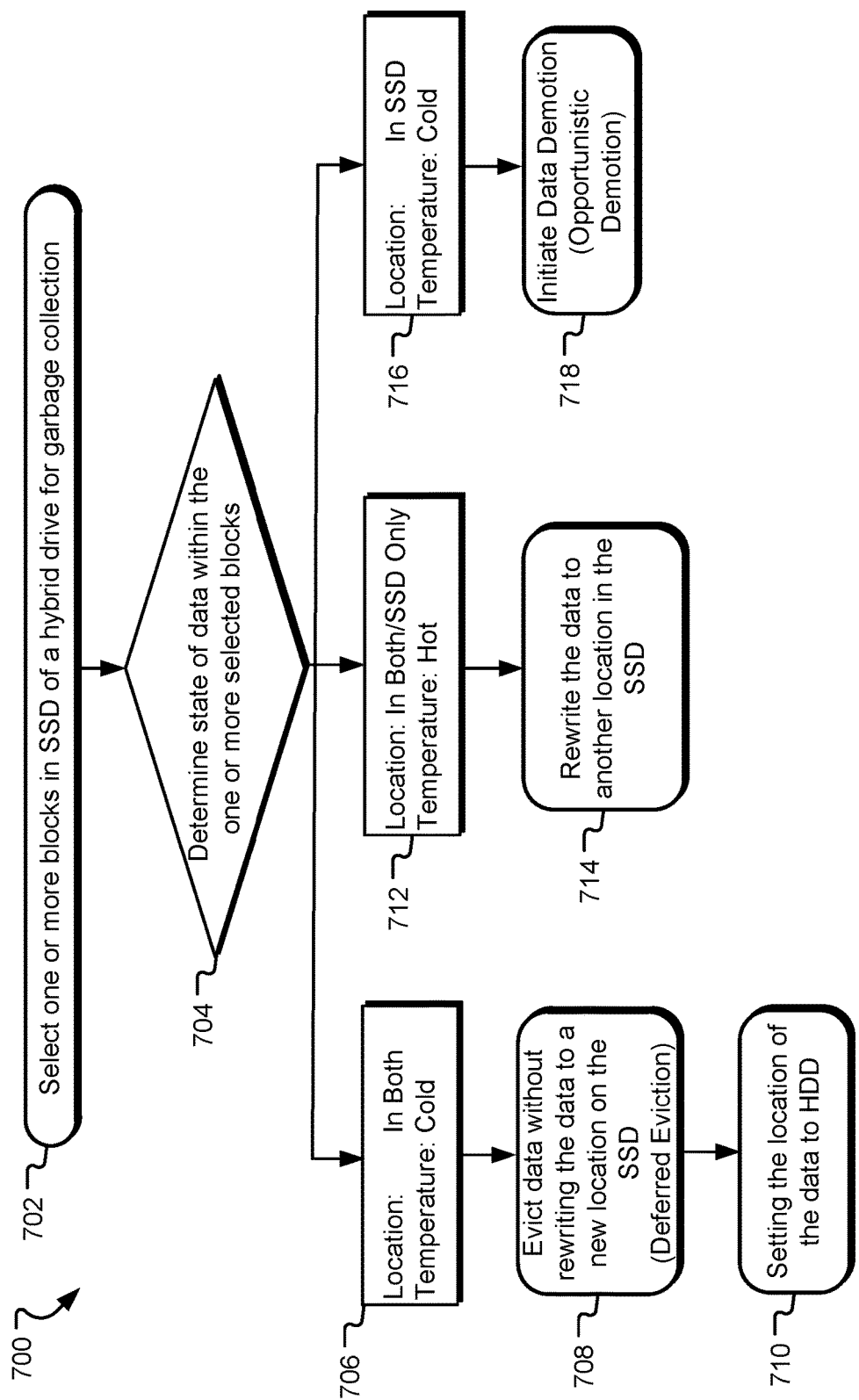

FIG. 7 illustrates example operations for garbage collection in a hybrid drive.

Figure 8:
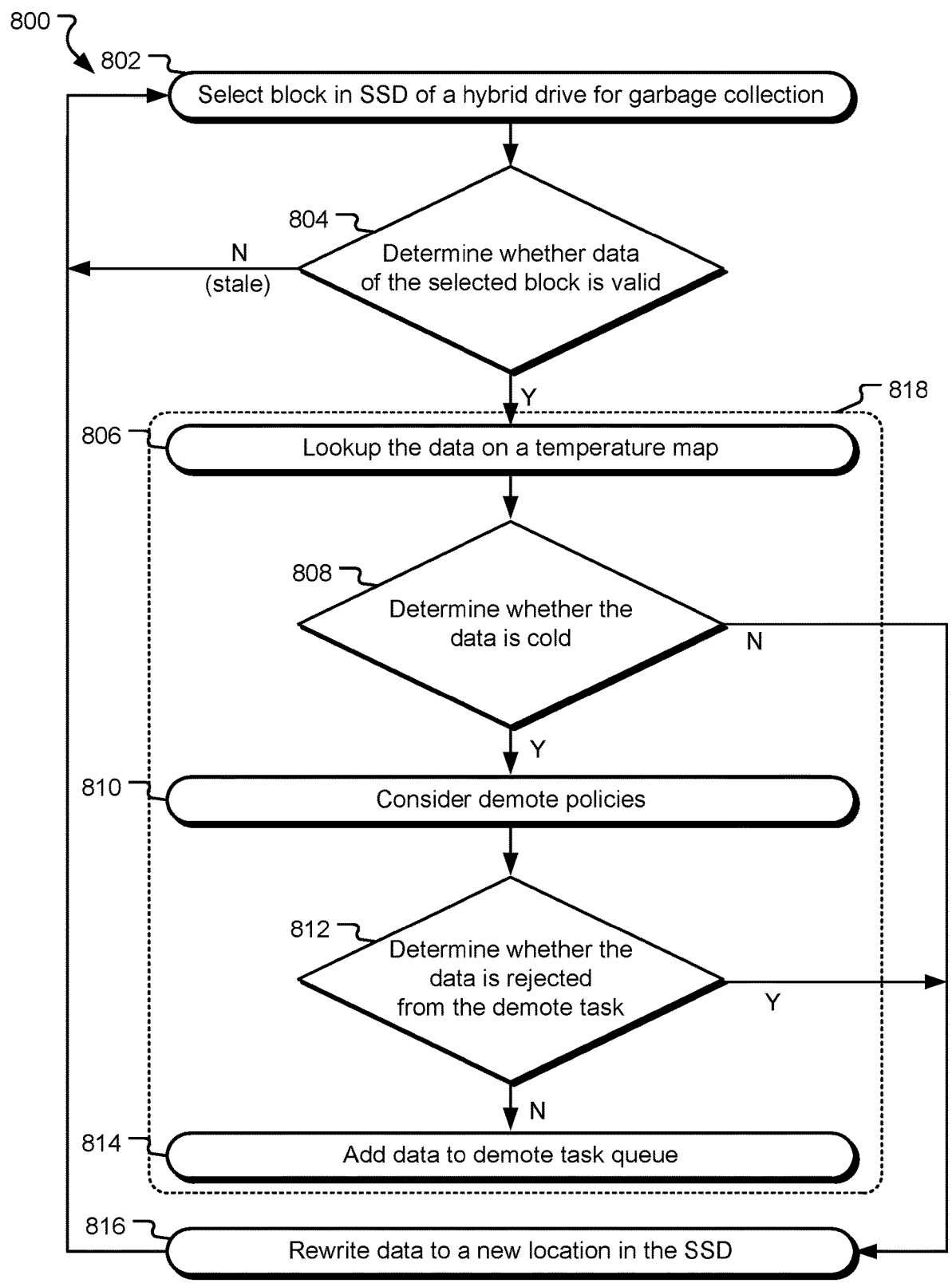

FIG. 8 illustrates example operations for a garbage collection process implementing opportunistic demotion.

Figure 9:
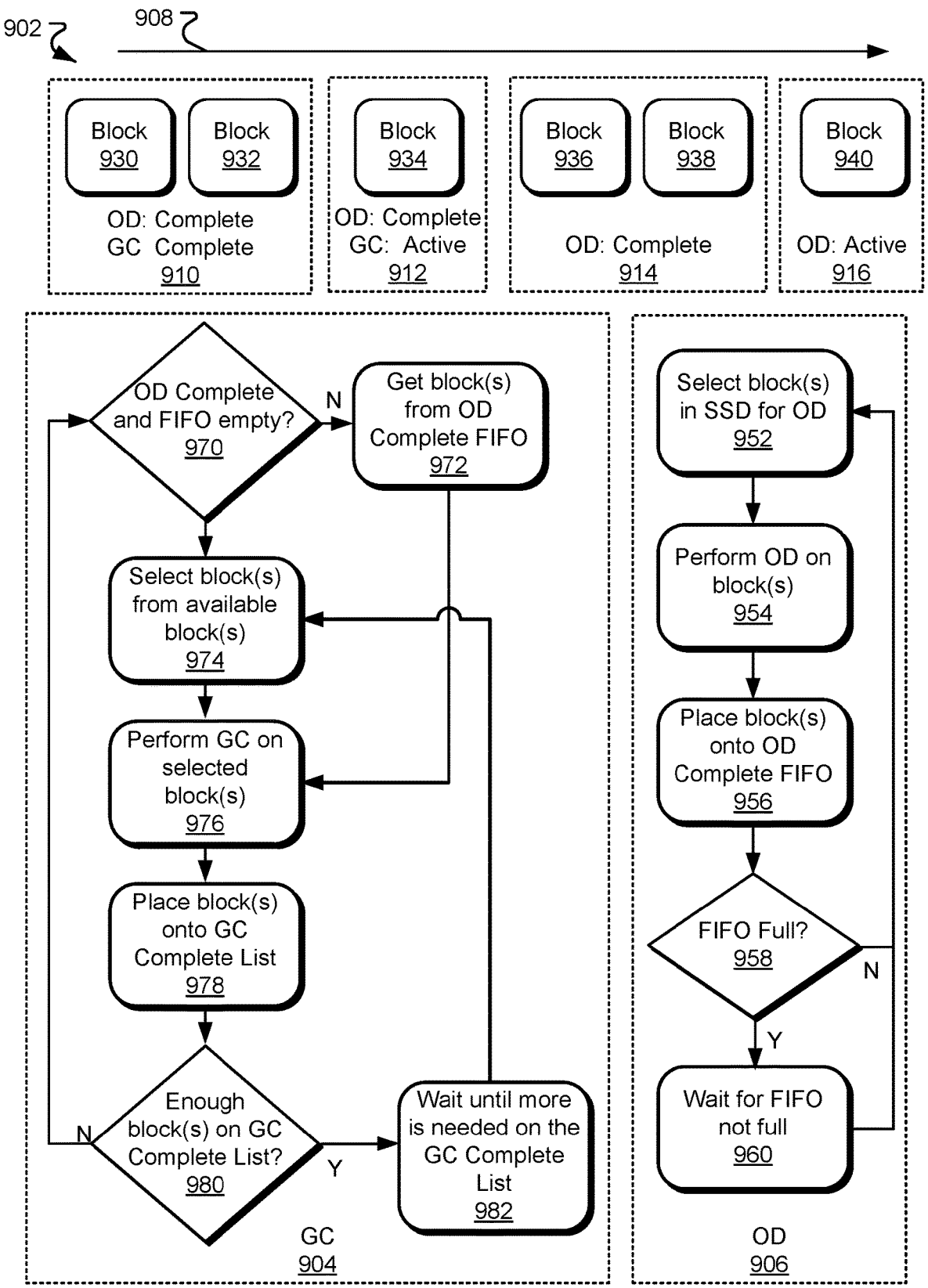

FIG. 9 illustrates an implementation of opportunistic demotion and garbage collection.

DETAILED DESCRIPTION

A hybrid drive storage device may include one or more hard disk drives (HDDs) (e.g., having rotating magnetic or optical media), and one or more solid state drive (SSDs) caches. In implementations, the HDD of a hybrid drive includes cheap and high capacity storage media for storing less frequently accessed data due to high read/write latency compared to the SSD caches. SSDs are generally fast access and as such the SSDs of the hybrid drive are used to hold hot data, or data that is frequently and/or recently accessed or important data (e.g., boot data). As such, hybrid drives, also referred to as SSHDs, combine HDD technology and SSD technology to leverage advantages of cost and speed.

A cache layer or cache algorithm generally determines what data is stored to an SSD of a hybrid drive. For example, the cache algorithm may decide when data is placed in the SSD or HDD, when data is to be demoted (moved from the SSD to the HDD) or promoted (moved from the HDD to SSD). These decisions are typically based on the cache algorithm's knowledge of the temperature of the data (e.g., hot or cold). Infrequently accessed data (e.g., cold data) in the SSD cache may be moved to the HDD in order to make space available in the SSD. When data is moved out of the SSD, the affected space in the SSD may not be used immediately by the SSD because in NAND technology, the minimum-sized unit that can be erased is a block and other data within the block the data was moved out of may still be valid (e.g. only stored on the SSD). As such, the SSD may go through a process of garbage collection, which is a method to reclaim free space created when a logical block address (LBA) is over-written with new data or moved out of SSD to the HDD (rendering a previous physical location on SSD associated with the data unused), Any remaining valid data within a plurality of blocks being garbage collected is moved to a new storage location (e.g. a new location on the SSD or HDD) at which point the plurality of blocks can be erased.

When the cache (SSD) becomes full, the cache layer must start evicting data from the cache in order to make room for new cache data. The eviction process involves moving data from the SSD to the HDD. However, due to the nature of the SSD cache (NAND), even though the physical space in the NAND occupied by the just evicted data is considered available, that vacated space cannot immediately be used. Garbage collection must be performed in the associated NAND block in order to move out all remaining valid data, if any. However, the garbage collection algorithm may determine that a particular NAND block in the SSD cache to be not attractive for garbage collection, so the block may not be garbage collected for an extended period of time. As such, the benefit of the vacated space may not be realized despite the amount of cached data being reduced.

Implementations described herein provide a hybrid drive system in which the garbage collection process of the SSD of a SSHD works together with the caching algorithm (e.g., cache layer). For example, after the cache layer demotes some data to the HDD of the SSHD, the data remains serviceable from the SSD cache until garbage collection processes the associated NAND block and finally "evicts" the data from the SSD. This process, called "deferred eviction," provides a number of benefits. First, the garbage collection process allows cached data to reside in the SSD as long as possible before having to remove (e.g., evict) it from the cache/SSD of the SSHD. Second, the amount of data moved as part of garbage collection can be minimized, which may enhance performance and endurance of the SSD and of the hybrid drive. Furthermore, the garbage collection process is provided with certain cache information, specifically a data temperature map, which allows it to minimize data rewrite, which improves write amplification resulting in SSD endurance. This process is referred to as "opportunistic demotion."

Figure 1:
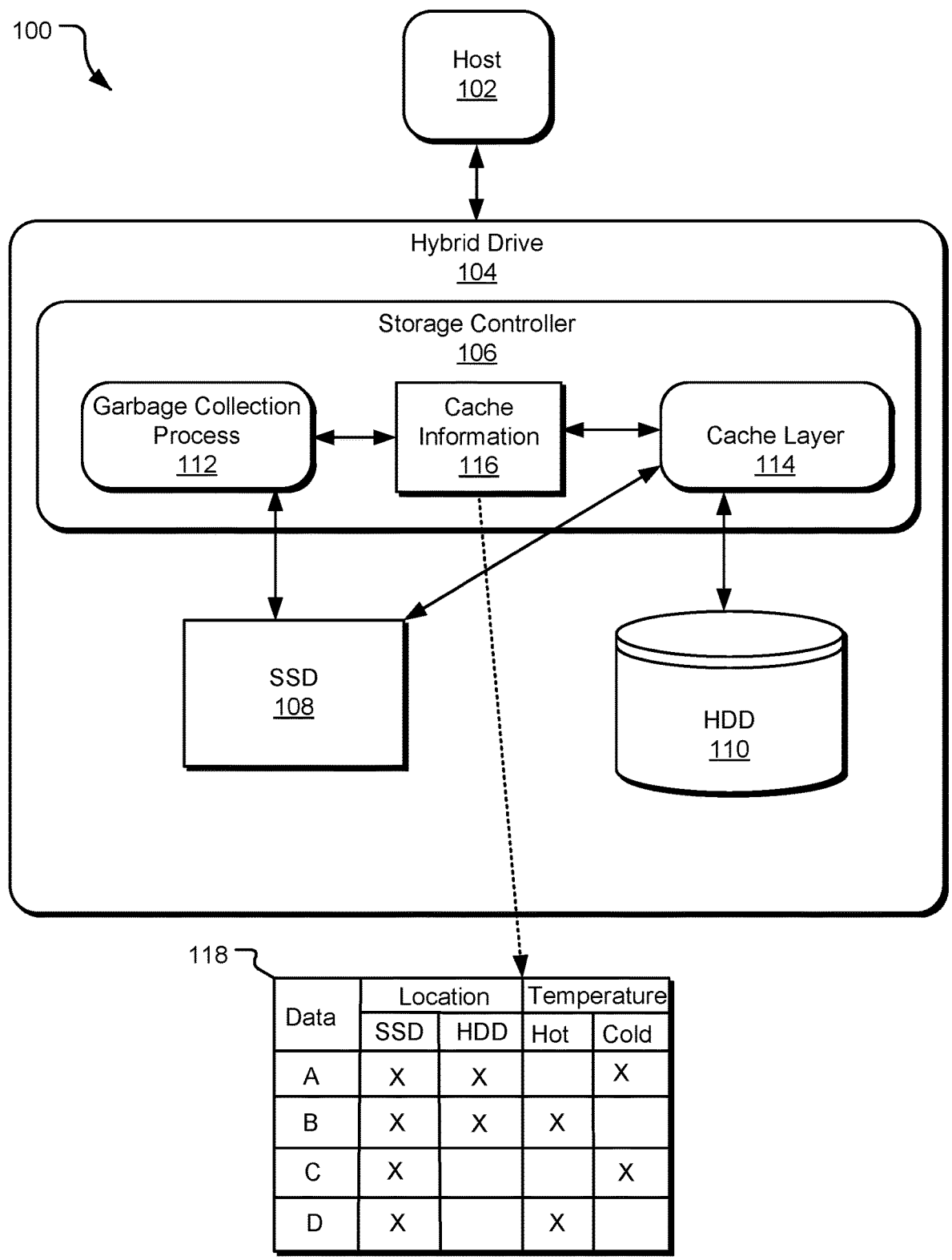
FIG. 1 illustrates an example block diagram of system with a hybrid drive.

FIG. 1 illustrates a block diagram of system 100 with a hybrid drive 104. The system 100 includes a host 102 having a processor (not shown) that is communicatively connected to the hybrid drive 104. The host 102 transmits data access commands (e.g., read, write, and/or erase commands) to the hybrid drive 104. While the system 100 is illustrated having the hybrid drive 104 external to the host 102, in an alternative implementation, the hybrid drive 104 may be internal to the host 102.

The hybrid drive 104 includes both a solid state drive (SSD) 108 having solid state media and a hard disk drive (HDD) 110 having high capacity magnetic or optical disc media. In illustrated implementation, storage media of the SSD 108 may be used as (and therefore referred to as) cache. The SSD 108 may incorporate NAND or DRAM technology to store data that is most directly associated with improved performance. Such data may include frequently or recently accessed or received data (also referred to as "hot" data). Data stored on the SSD 108 may also include boot data or data awaiting transfer to the HDD 110. It should be understood that the hybrid drive 104 may include multiple SSDs and/or multiple HDDs. For the sake of explanation, the SSD cache (e.g., solid state media of the SSD of the hybrid drive) will be hereinafter referred to as the SSD (e.g., SSD 108) but it should be understood that cache, solid state media, etc. may be used.

The hybrid drive 104 further includes a storage controller 106, which may include one or more instructions executed by a processor (not shown) to receive and process data access commands from the host 102. The storage controller 106 is also executed by the processor to perform garbage collection (e.g., the garbage collection process 112) and perform caching functions (e.g., a cache layer 114). The cache layer 114 may control various aspects of a cache (e.g., the SSD 108) such as selecting data to be stored in the cache, selecting data to be moved or demoted to the HDD 110 (also referred to as data "demotion"), selecting data to be moved or promoted from the HDD 110 to the SSD 108 (also referred to as data "promotion"), storing cache information (e.g., cache information 112), etc. While the hybrid drive 104 is illustrated having a single storage controller 106, it should be understood that the hybrid drive may include more than one storage controller. For example, the hybrid drive may have a separate storage controller for garbage collection, caching, memory management etc.

The garbage collection process 112 may consolidate data on the cache. For example, infrequently accessed data in the cache (also referred to as "cold" data) may be moved out of the cache 108. When data is moved out of the SSD 108 (e.g., to the HDD 110), the space may not be used immediately by the SSD 108. The garbage collection process 112 provides functionality in order for that space to be available for reuse. The garbage collection process 112 may include, for example, rewriting valid data to another location in the cache to make available large blocks of contiguous space in the SSD 108 for other cache uses.

The implementations described herein allow for the garbage collection process 112 and the cache layer 114 to work together by allowing the garbage collection process 112 utilize certain cache information (e.g., the cache information 116) such a data temperature map, a cache map, a flash translation layer (FTL), a hybrid drive translation layer, and/or a valid data tracking table to efficiently process data stored in cache. Depending on a state of the data, the garbage collection process 112 may perform one of several garbage collection and caching efficiency actions on the data. These garbage collection and caching efficiency actions may be referred to as "deferred eviction" and "opportunistic demotion." As used herein, "deferred eviction" may mean evicting data by not rewriting the data to another location on the SSD. Deferred eviction may also include decreasing the amount (e.g., a count) of valid data in the block where the data resides and/or setting the location of the data to in HDD only. "Opportunistic demotion" may mean selecting cold data in the SSD 108 to demote by moving it to a demote task queue.

A piece of data in the SSD 108 (e.g., the cache) can be in one of several cache states. The cache states may include location information and temperature information of the data. The cache states may be determined or set by the cache layer 114 (e.g., the caching algorithm). In the illustration, certain cache information is depicted in a data state table 118. It should be understood that the cache/data information may be stored in a different form such as temperature map, a valid data tracking table, a cache map, etc. As such, the temperature and the location of data may be retrieved from different resources. The data state table 118 is an illustration of the various information that may be retrieved about certain data within the cache 108. Data is considered located in a space where it is valid. For example, if a piece of data is on the SSD 108, but the data is no longer valid (e.g., the data is stale), then it is not considered located on the SSD 108. The location of the data can be "in SSD," wherein the cache data is valid only in the SSD 108, or "in Both" where the cache data is valid in both the SSD 108 and the HDD 110. The temperature of the data may be "hot" (e.g., recently or frequently accessed data) or cold (e.g., infrequently accessed data). The temperature may also indicate how likely a given data region would be accessed by the host.

In various implementations, the location (e.g., 'In SSD,' 'In HDD,' 'In Both') may be determined by referencing a hybrid drive translation layer stored in the SSD 108 of the hybrid drive. Such a translation layer may include an entry for every logical data unit (e.g., a 4 k unit) of the solid state media of the SSD 108. In various implementations, the translation layer is a multi-level map, with upper level map entries corresponding to a plurality of logical data units. In these implementations, the cache layer 114 and the garbage collection process may have access to and may update entries in the translation layer.

The cache layer 114 may deprioritize specific data and demote the data by copying the data from the SSD 108 to the HDD 110. As such, the data may be "in both" and "cold" (e.g., data "A" of data state table 118). Because the data A is in both the SSD 108 the HDD 110, it can still be serviced from the SSD 108 even though it has been demoted. As such, the data is still serviceable from the SSD 108 until the garbage collection process 112 encounters the data to evict it. If and when the garbage collection process 112 processes the block that holds data A, it can "evict" the data by not rewriting it (e.g., as it would with "hot" data, as described below) to a new location in the SSD 108 and removing a mapping from a cache map (or as in illustrated hereinafter, removing the data from the data state table 118). The location of the data may be changed from "in both" to in the HDD 110 only. This process of not rewriting the data and removing the data mapping from a cache map may be referred to as "deferred eviction," because it saves garbage collection resources by not rewriting the data and also preserves the lifespan of the SSD 108 by avoiding an unnecessary rewrite.

Data may be in both the SSD 108 and the HDD 110 and "hot" (e.g., data B of the data state table 118) because the cache layer 114 determines that the data is hot or frequently accessed. In this state, both the SSD 108 and the HDD 110 contain the same data B. If the garbage collection process 112 encounters data B (e.g., in Both and Hot data), then it re-writes the data to a new location on the SSD 108 freeing the old location of data B on the SSD 108 so that the block or blocks containing the old data B can be erased once all the valid data in the block or blocks has been moved to another storage location. Similarly, if the data is hot and in the SSD 108 only, then the garbage collection process 112 may rewrite the data to another location on the SSD 108 freeing the old location of data B on the SSD 108 so that block or blocks containing the old data B can be erased once all valid data has been moved to another storage location.

If the garbage collection process 112 encounters data that is only in the SSD 108 and cold (e.g., data C of state table 118), then the garbage collection process 112 may perform an "opportunistic demotion." Data may be in SSD 108 only and cold when the data has yet to be demoted (e.g., copied to the HDD 110) by the cache layer 114. When the garbage collection process 112 performs opportunistic demotion, it can initiate a data demote by moving the data to the HDD 110. In this case, it avoids a rewrite to a new location on the SSD 108, saving garbage collection resources and the endurance of the SSD 108. In some implementations, when considering whether to initiate a data demotion, the garbage collection process 112 may compare the temperature of the data to a "cold threshold value." If the data meets this threshold value, then the data is demoted. In implementations, the location of the data may be updated by removing a mapping of the data from a cache map or changing the state of an entry associated with the data in a hybrid drive translation layer.

In alternative implementations, data demotions are handled by a separate demote process. As such, when a demotion is initiated by the garbage collection process 112, then the data (or a reference to the data) is passed to the separate demote process or task. The demote process may be responsible for moving data from the SSD 108 to the HDD 110. The demote process may store demote requests in a queue of requests. Because the HDD 110 write throughput is slow compared to the throughput of the SSD 108, especially for random writes, the demote process may apply certain optimizations. Such optimizations may include queuing demote requests so it can better coalesce sequential input/outputs (IOs) and reordering demote requests such that the write I/O pattern to the HDD is less random.

In some implementations, demotions may be rejected (e.g., by the demote task) based on certain conditions or policies. The conditions that may be checked include (1) whether the number of pending demotion requests is greater than a certain threshold; (2) whether the SSD 108 capacity is less than a certain threshold; and (3) whether the entropy of the data is below a certain threshold. For example, the demote task may reject a demotion request because the requests queue is at or above a threshold because a large request queue may utilize system resources. The demote task may further reject requests when the SSD 108 is below a capacity threshold because demotion may not be necessary to save space on the SSD 108. In another example, a request may be rejected based on the size of the data of the request. The size of the request may be compared to a threshold to determine whether to demote the data. If the size of data is below the threshold, then the request may be rejected; if the size of the data is above the threshold, then the request may be accepted and the data demoted. Further, a request may be rejected because the size of the data is small compared to the overall capacity of the SSD 108, meaning that demotion of the data may not increase capacity in a significant manner. This may be referred to as the entropy of the data. Another example for utilizing the entropy is, for example, a 64K block of host data may be requested for demotion. However, that data may be compressed to 4K on the SSD. Therefore, 4K of data will be made available if the data is demoted, thus the request may be rejected because the capacity gains are not significant compared to the 64K request.

One or more blocks in the SSD 108 may be selected for garbage collection based on the amount of free space in the one or more blocks. The amount of free space is based on the amount of invalid data in the one or more blocks and the amount of data that is tagged for demotion in the one or more blocks. The remaining data is data to be garbage collected. As such, the one or more blocks are selected from blocks with the largest amount of invalid data plus the amount of data that is tagged for demotion, which leaves the lowest amount of data to be garbage collected. Selecting the one or more blocks in this manner reduces the amount of data to be garbage collected, effectively reducing write amplification and increasing the life span of the SSD. As discussed above, in various implementations the garbage collection process 112 may have access to a hybrid drive translation layer that includes cache states for logical blocks of the SSD 108. As such, the garbage collection process may reference the translation layer to determine which block(s) to garbage collect.

In implementations, the hybrid drive 104 contains more than one storage controller 106. For example, the SSD 108 may have its own storage controller that handles garbage collection and caching. The HDD 110 may have its own storage controller that receives write requests from the host 102 and from the storage controller of the SSD 108. Furthermore, the HDD 110 may include a buffer memory to store write data until writes to the HDD are complete. In other implementations, the hybrid drive may contain solid state memory (e.g., represented by SSD 108) and disc memory (e.g., represented by HDD 110) handled by one or more controllers. It should be understood that the implementations described herein may be applicable to a number of configurations of hybrid drives that contain one or more caches (e.g., SSD, flash, NAND) and disc memory (e.g., optical or magnetic).

FIG. 2 illustrates example information and data flow 200 in a hybrid drive. Specifically, FIG. 2 illustrates a garbage collection (GC) process 202 and a caching process (e.g., caching layer or caching algorithm) 204 processing data (e.g., data A) of a portion of a SSD 206 (cache) of a hybrid drive. The data (e.g., data A), may be processed as a logical data unit. As such, "data A" may correspond to a particular logical data unit. The hybrid drive further includes an HDD 208 having disc media storing certain data (e.g., data D, which may correspond to a logical data unit). FIG. 2 further illustrates a data state table 210, which illustrates certain information (e.g., location and temperature information) about data (e.g., data A, B, and C) on the SSD 206. It should be understood that the data state table 210 is for illustrative purposes and the information about data on the SSD 206 may be retrieved from and changed on a cache map, data temperature map, valid data tracking table, a flash translation layer (FTL), a hybrid drive translation layer, etc.

In FIG. 2, the caching process 204 is processing a block 234 of the SSD 206 containing data A (or a logical data unit corresponding to data A), and the garbage collection process 202 is processing a block 230 containing a nonspecific data. Data D is stored only on the HDD 208 of the hybrid drive, and is thus not represented in the data state table 210.

FIG. 3 further illustrates the example information and data flow in the hybrid drive illustrated in FIG. 2. Specifically, FIG. 3 illustrates a garbage collection (GC) process 302 and a caching process 304 processing certain data blocks of a SSD 306. FIG. 3 includes a HDD 310 of the hybrid drive and a data state table 310 (as discussed above with respect to FIG. 2). In FIG. 3, the caching process 304 is processing a block 338 of the SSD 306, meaning that the caching process 304 completed processing block 334 (e.g., 234 in FIG. 2), which includes data A. While processing block 334, the caching process 304 demotes data A, which consists of copying data A and writing data A to the HDD 308. The HDD 308 is illustrated having data A. The caching process 304 also updates the data state table 310 to note that data A is cold data. The caching process 304 may also decrease a count of valid data associated with the block 334 off the SSD 304. Data A is, at this point, still serviceable from the SSD 306. Moreover, the caching process 304 has data B to block 338 of the SSD 306. The caching process 304 may add data B in response to receiving data B in a write request (recently added), or the caching process 304 may retrieve data B from the HDD 308 (recently accessed). Because data B is recently added recently accessed, it is noted as hot data and added to the data state table 310.

In FIG. 3, The garbage collection process 302 moves from a block 330 (e.g., the block 230 in FIG. 2 to a block 332). FIGS. 4-6 illustrates the various garbage collection and caching efficiency actions that the garbage collection process may take when encountering data in different states.

FIG. 4 further illustrates the example information and data flow in the hybrid drive illustrated in FIGS. 2 and 3. Specifically, FIG. 4 illustrates a garbage collection process 402 and a caching process 404 processing certain data blocks of a SSD 406. FIG. 4 includes an HDD 408 of the hybrid drive and a data state table 410 (as discussed above with respect to FIG. 2). In FIG. 4, the garbage collection process 402 is processing a block 434 of the SSD 406, which contains data A. In FIG. 4, the caching process 404 demotes data A. Referring again to FIG. 4, the garbage collection process 402 retrieves or receives data information associated with data A, which shows that data A is in an "in both and cold" state. Thus, the garbage collection process 402 may evict the data by removing the data (or a reference to the data) from a valid data tracking table (illustrated by the line 412 on the data state table 410) or marking a reference to the data is 'In HDD'. Because data A is cold, the garbage collection does not rewrite the data A to another location on the SSD 406. This conserves resources and prolongs the lifespan of the SSD 406. In implementations, the garbage collection process 402 may also change the state associated with the data to "in HDD" 408 by removing a mapping of the data from a cache map or changing the state of an entry associated with the data in a flash translation layer (FTL) or hybrid drive translation layer.

FIG. 5 further illustrates the example information and data flow in the hybrid drive illustrated in FIGS. 2-4. Specifically, FIG. 5 illustrates a garbage collection process 502 and a caching process 504 processing certain data blocks of a SSD 506. FIG. 5 includes an HDD 508 of the hybrid drive and a data state table 510 (as discussed above with respect to FIG. 2). In FIG. 5, the garbage collection process 502 is illustrated processing block 538.

In the state in which the garbage collection process is processing the block 538, which had contained data B (e.g., block 438 in FIG. 4). The garbage collection process 502 determines that data B is hot data, and writes (a write illustrated by arrow 520) it to another location (e.g., a block 530) in the SSD 506, freeing the old location of data B on the SSD 506 so that block or blocks containing the old data B can be erased once all valid data has been moved to another storage location.

FIG. 6 further illustrates the example information and data flow in the hybrid drive illustrated in FIGS. 2-5. Specifically, FIG. 6 illustrates a garbage collection process 602 and a caching process 604 processing certain data blocks of a SSD 606. FIG. 6 includes an HDD 608 of the hybrid drive and a data state table 610 (as discussed above with respect to FIG. 2).

The garbage collection process 602 encounters data C, which is only in the SSD 606 and cold (as can be seen by the data state table 610). Because data C is cold and in the SSD only, the garbage collection process 602 issues an opportunistic demotion. As such, data C (or a reference to data C) may be passed to a demotion process 624 such that data C may be written to the HDD 608, thereby making space available in the SSD 606. The demotion process 624 or garbage collection process 602 may remove (e.g., illustrated by line 612) reference to the data in the state location table 610 (or other caching information data structure).

FIG. 7 illustrates example operations 700 for garbage collection in a hybrid drive. The operations 700 of a garbage collection process may be embodied in processor executable instructions stored on a storage media of a storage controller of the hybrid drive and executed by a processor. The storage controller may be an aspect of the hybrid drive storage controller or a storage controller particular to an SSD of the hybrid drive. A selection operation 702 selects one or more blocks in the SSD of the hybrid drive for garbage collection. In one implementations, the selection may be based on an amount of valid data in data blocks of the SSD. For example, the garbage collection process may reference a valid data tracking table that may include counts for the amount of valid data in an associated block. In the same or alternative implementations, the selection may be based on an arrangement of data blocks, such the blocks are selected in a sequence. A determination operation 704 determines a state of the data (e.g., data corresponding to a logical data unit) within the one or more selected blocks. As the garbage collection process processes the selected one or more blocks, the garbage collection process may determine the state of data corresponding to a plurality of logical data unit of the selected block(s). As such, operations (and states) 704-718 may occur a number of times within the selected one or more blocks. The state may include a temperature and a location of the data. The temperature may be retrieved from a temperature map, and the location may be retrieved from a valid data tracking table, cache map, caching structure, flash translation layer (FTL), hybrid drive translation layer, etc. The three possible states of data include at least, a first state 706, a second state 712, and a third state 716. Depending on the determined state of the data, one of three garbage collection and caching efficiency actions may be processed on the data.

The first state 706 is data wherein the data corresponding to the logical data unit is determined to be in both the SSD and the HDD of the hybrid drive and cold data. The data may be cold because a cache layer had previously deprioritized the data and copied the data to the HDD. Before the garbage collection selection process encounters this data, it is still serviceable from the SSD. In response to determining that the data is in the first state 706, then the garbage collection process may perform an evicting operation 708 which evicts the data by not rewriting the data to a new location on the SSD (e.g., a deferred eviction action). The evicting operation 707 may include decreasing a valid data count for the selected block, and setting the location of the data to in HDD only by removing a mapping of the data from a cache map and changing the state of an entry associated with the data on a flash translation layer (FTL) (or a hybrid drive translation layer). This deferred eviction action avoids an unnecessary rewrite in the SSD by the garbage collection process, which may conserve resources and prolong the lifespan of the SSD. The garbage collection process may then return to determination operation 704 for a different piece of data.

The second state 712 includes data that is determined to be located either in both the SSD and the HDD of the hybrid drive or only in the SSD and the temperature is hot. In response to a determination that the data is in the second state 712, the garbage collection process performs a rewriting operation 714, which rewrites the data to another location in the SSD. The rewriting operation 714 is operable to freeing the old location of the data on the SSD so that block or blocks containing the old data can be erased once all valid data has been moved to another storage location. The garbage collection process may then return to determination operation 704 for a different piece of data.

The third state 716 includes data that is determined to be in the SSD only and cold. In response to determining that the data is in the third state 716, the garbage collection process initiates a data demotion (e.g., an opportunistic demotion) in initiating operation 718. The garbage collection may pass the data (or a reference to the data) to a separate demotion process, which may decide to process or reject the demotion request. This opportunistic demotion process is described further with respect to FIG. 8. The garbage collection process may then return to determination operation 704 for a different piece of data.

FIG. 8 illustrates example operations 800 for a garbage collection process implementing opportunistic demotion. The operations 800 of a garbage collection process may be embodied in processor executable instructions stored on a storage media of a storage controller of the hybrid drive and executed by a processor. The storage controller may be an aspect of the hybrid drive storage controller or a storage controller particular to an SSD of the hybrid drive. A select operation 802 selects one or more blocks in the SSD of the hybrid drive for garbage collection. In implementations, the selection may be based on an amount of valid data in data blocks of the SSD. In the same or alternative implementations, the selection may be based on an arrangement of data blocks, such the one or more blocks are selected in a sequence. In implementations, groups of blocks are selected for garbage collection, such as a group of blocks protected by an outer code.

A determining operation 804 determines whether data corresponding to a logical data unit of the selected one or more blocks is valid. In implementations, the garbage collection process may access a valid data tracking table to make the determination. In other implementations, the garbage collection process may determine the validity of the data by referencing an entry of a flash translation layer (FTL) (or hybrid drive translation layer) associated with the data corresponding to the logical data unit. If the garbage collection process determines that the data is not valid (e.g., stale) then the garbage collection process may return to selecting operation 802 to select a new data block(s) or the garbage collection process may select the next piece of data (or next logical data unit) in the one or more selected blocks. If the garbage collection process determines that data in the selected one or more block is valid, the garbage collection process will proceed to the opportunistic demotion process 818, which includes a lookup operation 806 that looks up the data (e.g., the logical data unit) on a temperature map. In a second determination operation 808, the garbage collection uses the temperature map to determine whether the data is cold. The determination operation 808 may compare the determined temperature to a cold threshold value to determine whether the data is cold. If the data is not cold (e.g., hot), then the garbage collection process proceeds to a rewrite operation 816, which rewrites the data to a new location in the SSD. The rewrite operation 816 is operable free the old location of the data on the SSD so that the block or blocks containing the old data can be erased once all the valid data in the block or blocks has been moved to another storage location If the determining operation 808 determines that the data is cold, then demote polices may be considered in a considering operation 810. The garbage collection process itself may consider the demote polices or the data may be passed to a separate demote process, which checks the demote polices itself. The polices that may be considered include: (1) the number of pending demotion requests; (2) the fullness of the SSD; and (3) the entropy of the data. Each of these polices may be compared to a threshold. The demote process or the garbage collection process may reject the demote request based on these polices. In determining operation 812, the garbage collection process determines whether the data is rejected based on these policies. If the garbage collection process determines that the data is rejected from the demote task, then the garbage collection process processed to rewrite operation, which rewrites the data to a new location in the SSD. If the garbage collection process determines that the data is not rejected from the demote task, then the data is added to a demote queue task in an adding operation 814. The demote task may handle demotions (e.g., data moves from SSD to the HDD) that are queued. The garbage collection process may select one or more different blocks of the SSD in operation 802 or may select the next piece of data (e.g., the next logical data unit) in the already selected block to process.

FIG. 9 illustrates an implementation of opportunistic demotion and garbage collection. Specifically, FIG. 9 illustrates stages 902 of opportunistic demotion, example operations 906 for opportunistic demotion (OD), and example operations 904 garbage collection. In the illustrated implementation, the opportunistic demotion process runs as a preprocessing stage to garbage collection on a given block or group of blocks of an SSD of a hybrid drive, the block or group of blocks goes through opportunistic demotion first then garbage collection. This staging prevents opportunistic demotion from hindering or slowing down the garbage collection process. In this implementation, the opportunistic demotion process is generally slightly ahead and processing blocks that will garbage collected in the future. This staging is illustrated stages 902. In a stage 910, opportunistic demotion and garbage collection are both complete on a block 930 and a block 932 of an SSD. In a stage 912 opportunistic demotion is complete and garbage collection is active on a block 934 of the SSD. In a stage 914 opportunistic demotion is complete on blocks 936 and 938 of the SSD. In the stage 914, the garbage collection process has yet to reach the blocks 936 and 938. In a stage 916, opportunistic demotion is active on block 940. This staging process is illustrated by arrow 908, moving from left to right on the SSD.

In the opportunistic demotion operations 906, which generally occur before the garbage collection operations 904, a selecting operation 952 selects one or more blocks in the SSD for opportunistic demotion. The selection of blocks by the opportunistic demotion task will generally use the same criteria as the garbage collection process. For example, if garbage collection selects blocks based on the amount of valid data, then the opportunistic demotion process would use the same criteria. Any "cold" data in the selected one or more blocks will be opportunistically demoted. The cold data (or a reference to the logical data unit corresponding to the cold data) may be passed to a demote process, which may perform the opportunistic demotion operations 818 of FIG. 8. After completion of the opportunistic demotion process, the blocks (or references to the blocks) are placed onto an opportunistic demotion complete first in first out (FIFO) queue in a placing operation 956. Next, a determining operation 958 determines whether the opportunistic demotion FIFO queue is full. If the FIFO is full, the opportunistic demotion process waits for until the FIFO is not full in waiting operation 960. If the FIFO is not full and after waiting in operation 960, the opportunistic demotion process returns to the selecting operation 952, which selects one or more next blocks for opportunistic demotion.

In the garbage collection operations 904, which generally occur after the opportunistic demotion operations 906 in this implementation, a determining operation 970 determines whether opportunistic demotion complete FIFO is empty. If the opportunistic demotion FIFO is not empty, then one or more blocks from the opportunistic demotion FIFO queue is selected for garbage collection in selecting operation 972. If the opportunistic demotion FIFO is empty, then the garbage collection process can select one or more blocks on the SSD for garbage collection in selecting operation 974. A performing operation 976 performs garbage collection on the selected blocks. Any logical data units of the selected blocks may be processed based on a determined state of the data corresponding to the logical data unit. The performing operation 976 may include operations 700 from FIG. 7 which selects different operations based on the state of data within the selected block (e.g., deferred eviction or rewriting). After completion of garbage collection on the selected blocks, a placing operation 978 places the selected blocks onto a garbage collection complete list. A determining operation determines whether enough blocks are on the garbage collection complete list 980. If enough blocks are on the garbage collection complete list, then waiting operation 982 waits until more blocks are needed on the garbage collection complete list. If there are not enough blocks on the garbage collection complete list, then the garbage collection process returns to the determining operation 970. As such, the demotion process may be referred to as staging prior to the garbage collection process, where as much data as possible is moved to the HDD "opportunistically."

Blocks on the GC complete list represent empty blocks that can be erased and written with new data. In implementations, the number of "enough" blocks on the complete list is determined by a threshold. The threshold may be adjustable based on how much free space is on the drive and/or how large a burst of data can be received from the host. For example, if there are a large number of empty blocks (e.g., blocks that have been garbage collected), the garbage collection process is suspended to save resources.

In this implementation, the opportunistic demotion process is separate from the garbage collection process. The function of the opportunistic demotion process is to provide blocks that have completed opportunistic demotion. However, the garbage collection process is not dependent on the completion of the opportunistic demotion process. The garbage collection process can continue with garbage collection even when the opportunistic demotion has not completed processing a sufficient number of blocks. Thus, the garbage collection process may process blocks before the opportunistic demotion process (e.g., the garbage collection process gets "ahead" of the opportunistic demotion process). The garbage collection operations 904 and the opportunistic demotion operations 906 may be embodied in instructions stored on a storage media and executable by a processor.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
    selecting one or more blocks in a SSD of a hybrid drive for cache processing and garbage collection, the hybrid drive including an HDD;
    determining a state of data corresponding to a first logical data unit in the one or more selected blocks and storing the state as cache information, the state indicating:
        location information of the data indicative of whether the data resides in the SSD only, in the HDD only, or in both the SSD and the HDD, and
        a temperature of the data;
    demoting the data corresponding to the first logical data unit in the cache processing by not rewriting the data corresponding to the first logical data unit to a new location in the SSD based on the determined state, wherein the data corresponding to the first logical data unit remains serviceable from the SSD; and
    performing the garbage collection on the data corresponding to the first logical data unit after the demoting operation by accessing the cache information to retrieve the state of the data corresponding to the first logical data unit and evicting the data by removing a mapping of the data corresponding to the first logical data unit to the SSD from the cache information without rewriting the data corresponding to the first logical data unit to a new location in the SSD based on the state of the data;
    wherein the determined state indicates that location of the data corresponding to the first logical data unit is in both the SSD and the HDD of the hybrid drive and the temperature of the data corresponding to the first logical data unit is cold.

2. The method of claim 1 further comprising:
    determining the state of data corresponding to a second logical data unit in the one or more selected blocks in the SSD;
    rewriting the data corresponding to the second logical data unit to another location on the SSD based on the determined state.

3. The method of claim 2 wherein the determined state indicates that the location of the data corresponding to the second logical data unit is in both the SSD and the HDD and the temperature of the data corresponding to the second logical data unit is hot.

4. The method of claim 1 further comprising:
    determining the state of data corresponding to a second logical data unit in the one or more selected blocks in the SSD; and
    initiating demotion of the data corresponding to the second logical data unit to the HDD based on the determined state.

5. The method of claim 4 wherein the determined state indicates that the location of the data corresponding to the second logical data unit is in the SSD and the temperature of the data is cold.

6. The method of claim 4, wherein initiating demotion of the data includes passing the data corresponding to the second logical data unit to a queue of demotion jobs.

7. The method of claim 4, wherein demoting the data further comprises:
    determining whether a policy condition is satisfied, the policy condition being based on at least one of a number of pending demotion requests relative to a threshold, capacity of the SSD relative to a threshold, size of a demotion request, and entropy of data in the SSD.

8. The method of claim 1 further comprising:
    updating the state of the data corresponding to the first logical data unit, wherein updating the state of the data corresponding to the first logical data unit further comprises one of removing a mapping of the data from a cache map and changing the state of an entry associated with the logical data unit data on a translation layer stored in the SSD.

9. One or more processor-readable non-transitory storage media encoding computer-executable instructions for executing on a computer system a computer process, the computer process comprising:
    selecting one or more blocks in a SSD of a hybrid drive for garbage collection, the hybrid drive including an HDD;
    determining a state of data corresponding to a first logical data unit in the one or more selected blocks, the state indicating:
        location information indicative of whether the data corresponding to the first logical data unit resides in the SSD only, in the HDD only, or in both the SSD and the HDD, and
        temperature of the data corresponding to the first logical data unit; and
    initiating demotion of the data corresponding to the first logical data unit to the HDD based on the determined state,
    wherein demoting the data further comprising, determining whether a policy condition is satisfied, the policy condition being based on at least one of a number of pending demotion requests relative to a threshold, the capacity of the SSD relative to a threshold, size of a demotion request, and entropy of data in the SSD.

10. The one or more processor-readable non-transitory storage media of claim 9 wherein the determined state indicates that the location of the data corresponding to the first logical data unit is in the SSD and the temperature of the data corresponding to the logical data unit is cold.

11. The one or more processor-readable non-transitory storage media of claim 9 further comprising:
    determining the state of data corresponding to a second logical data unit in the one or more selected blocks in the SSD;
    rewriting the data corresponding to the second logical data unit to another location to another location on the SSD based on the determined state.

12. The one or more processor-readable non-transitory storage media of claim 11 wherein the determined state indicates that the location of the data corresponding to the second logical data unit is in both the SSD and the HDD and the temperature of the data corresponding to the second logical data unit is hot.

13. The one or more processor-readable non-transitory storage media of claim 9 further comprising:
    determining the state of data corresponding to a second logical data unit in the one or more selected blocks in the SSD; and
    evicting the data corresponding to the second logical data unit from the SSD by not re-writing the data to a new location on the SSD based on the determined state.

14. The one or more processor-readable non-transitory storage media of claim 13 wherein the determined state indicates that location of the data corresponding to the second logical data unit is in both the SSD and the HDD of the hybrid drive and the temperature of the data corresponding to the second logical data unit is cold.

15. The one or more processor-readable non-transitory storage media of claim 9 wherein initiating the data demotion includes passing the data corresponding to the first logical data unit to a queue of demotion jobs.

16. The one or more processor-readable non-transitory storage media of claim 9 further comprising:
updating the state of the data corresponding to the first logical data unit wherein updating the state of the data corresponding to the second logical data unit further comprises one of removing a mapping of the data from a cache map and changing the state of an entry associated the data corresponding to the second logical data unit on a flash translation layer stored in the SSD.

17. A hybrid drive comprising:
hard disc media;
solid state media; and
a storage controller configured to:
  select one or more blocks in the solid state media for garbage collection;
  determine a state of data corresponding to a first logical data unit in the one or more selected blocks, the state indicating a location of the data corresponding to the first logical data unit in both the solid state media and the hard disc media and a temperature of the of the data corresponding to the first logical data unit is cold;
  evict the data corresponding to the first logical data unit by not rewriting the data to a new location in the solid state media and updating the state of the data to indicate the data corresponding to the first logical data unit is in the HDD only based on the determined state;
  determine another state of data corresponding to a second logical data unit in the one or more selected blocks, the another state indicating a location of the data corresponding to the second logical data unit in the solid state media only and a temperature of the of the data corresponding to the first logical data unit is cold; and
  initiate demotion of the data corresponding to the second logical data unit to the hard disc media by moving the data corresponding to the second logical data unit to the hard disc media and updating the another state of the data to indicate the data corresponding to the second logical data unit is in the HDD only based on the determined another state.

18. The hybrid drive of claim 17 wherein the location is determined using a translation layer and the temperature is determined using a data temperature map.

19. A method comprising:
selecting one or more blocks in a solid state media of a hybrid drive for opportunistic demotion;
demoting data corresponding to a first logical data unit in the one or more selected blocks if the state indicates that the data is cold and a location of the data corresponding to the first logical data unit is in both the solid state media and a hard drive media of the hybrid drive, wherein the data corresponding to the first logical data unit remains serviceable from the solid state media;
selecting the one or more blocks in the solid state media of the hybrid drive for garbage collection, wherein the garbage collection evicts the data corresponding to the first logical data unit by removing a mapping of the data to the solid state drive and not rewriting the data to a new location in the SSD;
determining a state of data corresponding to a second logical data unit; and
processing the data corresponding to the second logical data unit based on the determined state.

* * * * *